(12) United States Patent
Katorgin et al.

(10) Patent No.: US 7,118,139 B2
(45) Date of Patent: Oct. 10, 2006

(54) FLANGED COUPLING DEVICE WITH A STATIC BALL-AND-SOCKET JOINT

(75) Inventors: Boris Ivanovitch Katorgin, Khimky (RU); Vladimir Konstantinovitch Tchvanov, Khimky (RU); Boris Mikhailovitch Gromyko, Khimky (RU); Eygueni Mikhailovitch Matveev, Khimky (RU); Igor Alexandrovitch Mikhaliov, Moscow (RU); Youri Vassilievitch Mitioukov, Moscow (RU); Ivan Denissovitch Postnikiov, Khimsky (RU); Olga Nikolaevna Jelezniak, Moscow (RU)

(73) Assignees: Snecma Moteurs, Paris (FR); NPO Energomash, Kimky (RU)

( * ) Notice: Subject to any disclaimer, the term of this patent is extended or adjusted under 35 U.S.C. 154(b) by 202 days.

(21) Appl. No.: 10/481,200

(22) PCT Filed: Jun. 29, 2001

(86) PCT No.: PCT/EP01/07851

§ 371 (c)(1),
(2), (4) Date: Dec. 18, 2003

(87) PCT Pub. No.: WO03/004920

PCT Pub. Date: Jan. 16, 2003

(65) Prior Publication Data

US 2004/0175226 A1 Sep. 9, 2004

(51) Int. Cl.
*F16L 19/00* (2006.01)
(52) U.S. Cl. ............... 285/368; 285/223; 285/263; 285/111; 285/917
(58) Field of Classification Search ............ 285/223, 285/263, 98, 914, 917, 368, 110; 277/317, 277/320, 321, 647, 626, 627
See application file for complete search history.

(56) References Cited

U.S. PATENT DOCUMENTS

| 5,354,072 A | 10/1994 | Nicholson |
| 6,241,254 B1 * | 6/2001 | Gromyko et al. ........... 285/368 |

FOREIGN PATENT DOCUMENTS

| GB | 2 218 167 A | 11/1989 |
| SU | 1499032 A2 | 8/1989 |

* cited by examiner

*Primary Examiner*—Aaron Dunwoody
(74) *Attorney, Agent, or Firm*—Weingarten, Schurgin, Gagnebin & Lebovici LLP

(57) ABSTRACT

The invention relates to couplings for fluid flowlines and more particularly to couplings that can be dismantled comprising flanges and a static ball-and-socket joint for use with flowlines having a diameter lying in the range 40 mm to 200 mm and transporting fluids (gases or liquids) of high penetrability, at high temperature of up to 800° C., and at high pressure of up to $450 \times 10^5$ Pa. Teh device comprises a flanged coupling device with a static ball-and socket joint comprising a first coupling member (1) having a conical sealing surface (8), a second coupling member (3) having concave sealing surface (10) of spherical shape, a two-barrier metal gasket (2) disposed between the sealing surface (8, 10) of the first and second coupling members (1, 3), and assembly means (4) for assembling the first and second coupling members (1, 3) together so as to hold the gasket (2) between their respective sealing surfaces (8, 10). The metal gasket (2) is made of a refractory granular nickel alloy that withstands hydrogen, having uniform fine grain structure with isotropic properties and coated in three sealing layers, the first layer (27) being of nickel, the second layers (28) being of silver, and the third layer (29) being an antifriction lubricant of an inorganic material that is compatible with the fluid used.

19 Claims, 4 Drawing Sheets

FLANGED COUPLING DEVICE WITH A STATIC BALL-AND-SOCKET JOINT

This application is a 371 national phase filing of PCT/EP01/07851 filed Jun. 29, 2001.

FIELD OF THE INVENTION

The present invention relates to couplings for fluid flowlines and more particularly to separable flanged couplings with a static ball-and-socket joint for flowlines of diameter lying in the range 40 millimeters (mm) to 200 mm transporting fluids (gases or liquids) of high penetrability, at high temperature possibly reaching 800° C., and at a pressure possibly as high as $450 \times 10^5$ Pascals (Pa.).

PRIOR ART

Flanged coupling devices with static ball-and-socket joints are provided to allow the axes of the flowlines to be at a certain angle relative to each other so as to prevent stresses building up on the coupling members and also on the pipework in order to provide adequate lifetime and to allow for multiple overhauls.

The angle between the axes of the flowlines can be accommodated in two ways:
  in a first system, an end piece having a male spherical bearing surface and forming an integral portion of the flowline to be coupled is swivelled through a certain angle relative to the axis of the coupling. This angle is determined by the radial gap between the inner cylindrical surface of a coupling cap and the outer cylindrical surface of the flowline for coupling that is secured to the spherical end piece;
  in a second system, one coupling member is swivelled relative to another within the axial gap that exists between coupling flanges.

Coupling devices having static ball-and-socket joints using the first system are described, for example, in documents GB-A-2 095 352 and GB-A-2 199 101. Those devices have flowline couplings in which a spherical male coupling member, a spherical female coupling member, and a cap with a spherical ball are caused to interact. That type of coupling is sealed by a metal gasket or cap having a spherical inner surface co-operating with a portion of the outer surface of the male coupling member and an outer surface that matches the inner surface of the female coupling member. The tilt angle of the tangent to the common spherical surface of the gasket and the coupling at the peripheral end of the gasket lies in the range 10° to 20°. A coupling of that type is generally used with low pressure flowlines and it does not lend itself to high pressures which generate significant radial forces causing the gasket to be destroyed.

Document GB-A-2 218 167 describes an example of a coupling device having a static ball-and-socket joint using the second system. In that type of system, a flanged male coupling member having a convex spherical surface is coupled to a flanged female coupling member having a concave spherical surface. Sealing between the members is provided by a metal gasket. The inner surface of the gasket has a spherical portion co-operating with a portion of the outer surface of the male coupling member. The outer surface of the gasket has a conical portion matching a seat in the inner surface of the female coupling member which converges towards the periphery of the coupling. The deflection angle between the axes of the flowlines depends on the gap between the front faces of the flanges and also on the diametral clearance represented by the difference between the diameters of the linking bolts and of the holes that receive them in the two flanges. That kind of device is preferably used with flowlines having free access to the bolts. A coupling of that type suffers from the drawback of having a female coupling member with an inner sealing surface presenting a slope of less than 20°, giving rise to intense radial compression that can damage the gasket.

The above-mentioned couplings are sealed by a metal gasket providing a single barrier. Experience shows that the sealing provided by a single-barrier gasket is not sufficiently reliable in situations where the values of pressure and temperature parameters are high, particularly with fluids that are characterized by high penetrability. In that kind of situation, single-barrier gaskets are made of alloys having a high nickel content such as Nimonik or Juconel 718. To improve sealing, such gaskets are coated in a protective layer of metal selected from the following group of metals: Ag, Cu, Au, Ni, etc. Document U.S. Pat. No. 5,354,072 describes the use of a combined layer, e.g. comprising nickel and polytetrafluoroethylene (PTFE). Nevertheless, the above-mentioned gaskets do not provide sealing with fluids that are characterized by operating parameters involving high penetrability at high temperature that can be as much as 800° C. and at a pressure greater than 4500 Newtons per square centimeter ($N/cm^2$).

A coupling device having a static ball-and-socket joint is also known from USSR author's certificate No. 1 499 032. In one of its aspects, the device described in that document is constituted by a first flanged coupling member, a second flanged coupling member, and a gasket providing two barriers which is held between the sealing surfaces of the first and second coupling members. The gasket is held in the first coupling member by a holding ring. The first coupling member has a seat with a cylindrical surface and a sealing surface of conical shape. The second coupling member has a concave sealing surface of spherical shape between a minimum diameter and a maximum diameter. The two-barrier metal gasket has two fine and resilient lips each terminated by a bead in leakproof contact with the sealing surfaces, an annular end co-operating with the cylindrical-surface seat, an inner surface portion in leakproof contact with the sealing surface of the first coupling member, and an outer surface portion of spherical shape in leakproof contact with the concave sealing surface of spherical shape of the second coupling member. The sealing surfaces of the gasket are coated in a protective layer of metal selected from the following group of metals: Ag, Cu, Au, Ni, etc. The device also includes leak monitoring means and spherical-head bolts screwed into the flange of the second coupling member with washers having spherical bearing surfaces installed between the heads of the bolts and the rear face of the flange on the first coupling member.

In that device, the angle between the axes of the flowlines is very limited, thus restricting its field of application. Furthermore, it is not specified that the metal gasket should use a material suitable for providing sealing with fluids containing hydrogen at high temperature and pressure. Nor does that document specify any means for reducing the radial forces acting on the coupling members. By failing to limit the magnitude of the radial forces, the lifetime of a coupling subject to high pressure and high cyclic loading will be short.

OBJECT AND BRIEF DESCRIPTION OF THE INVENTION

An object of the present invention is to mitigate the above-specified drawbacks, and in particular to provide a flanged coupling device with a static ball-and-socket joint that enables the assembly to increase the angular difference between the axes of the members to be coupled together.

Another object of the present invention is to reduce the radial load acting on the coupling members.

Another object of the present invention is to provide a coupling that includes a gasket which guarantees a long lifetime, and a high degree of sealing for fluids that contain high-penetrability hydrogen flowing in flowlines at high temperatures of up to 800° C. and at high pressures of up to $450 \times 10^5$ Pa.

According to the invention, these objects are achieved by a flanged coupling device having a static ball-and-socket joint, the device comprising:

a first coupling member having a cylindrical-surface seat and a sealing surface;

a second coupling member having a concave sealing surface that is substantially spherical in shape between a minimum diameter and a maximum diameter;

a two-barrier metal gasket placed between the sealing surfaces of the first and second coupling members, said gasket comprising:

two fine and resilient lips each of which is terminated by a toroidal bead in leakproof contact with the sealing surfaces;

an annular end having an inner surface co-operating with the cylindrical-surface seat; and a structural ring having an inner surface in leakproof contact with the sealing surface of the first coupling member, and an outer surface of spherical shape in leakproof contact with the concave sealing surface of spherical shape of the second coupling member;

leak monitoring means;

assembly means for assembling together the first and second coupling members so as to hold the gasket between their respective sealing surfaces; and means allowing a certain amount of angular deflection between the axes of the coupling members;

the coupling device being characterized in that the radius of curvature $R_c$ of the spherical surface of the second coupling member is such that the tilt angle β relative to the axis of the first coupling member of the tangent T to the spherical surface common to the gasket and the second coupling member at the point where the diameter of the second coupling member is at its maximum, lies in the range 27° to 33°; and the means allowing a certain amount of angular deflection between the axes of the coupling members are provided first by a gap A between facing front faces of the two coupling members and by radial clearance δ due to the difference between the diameters of each of the holes in the flange of the first coupling member and each of the assembly means.

More particularly, the angle α between the axes of the coupling members is given by the following relationship:

$$\tan\alpha \leq \frac{A}{R_i \cdot \cos\beta}$$

where:

A in mm is the axial gap between the face of the first coupling member and the facing face of the second coupling member when the assembled coupling members are in alignment;

$R_c$ in mm is the radius of curvature of the spherical surface common to the second coupling member and the gasket; and β is the tilt angle relative to the axis of the first coupling member of the tangent T to the spherical surface common to the gasket and to the second coupling member at the point where its outside diameter is at a maximum, where β lies in the range 27° to 33°.

The length of the radial clearance δ due to the difference in diameter between each hole in the first coupling member and each assembling means satisfies the relationship:

$$\delta \geq (A+H)\cdot\tan\alpha$$

where H in mm is the thickness of the flange of the first coupling member.

In an embodiment of the invention, the sealing surface of the first coupling member is a frustoconical surface, and the inner surface of the metal gasket is of matching conical shape.

The two-barrier metal gasket placed between the sealing surfaces of the first and second coupling members can be held in the first coupling member by a holding ring. The holding ring performs two functions:

holding the gasket while assembling the seal overhead to prevent the gasket dropping under the effect of gravity; and providing a barrier against pollution conveyed by the fluid.

The leak monitoring means is provided by monitoring holes through the gasket between the two barriers and co-operating with drainage channels in the first coupling members.

Draining any leakage between the barriers serves several functions:

during assembly or maintenance it enables the individual performance of each sealing barrier to be monitored;

in operational use it enables a leak between the barriers to be detected and triggers preventative action when the leak exceeds a threshold; and it enables a leak to be recycled (collected, removed).

In an aspect of the invention, the holes for the assembly means in the first coupling member are cylindrical.

The outside diameter of the flange of the first coupling member is greater than the outside diameter of the flange of the second coupling member by an amount which is equal to the difference δ between the radii of each of the holes through the flange of the first coupling member and each of the assembly means.

In another aspect of the invention, the holes for the assembly means through the flange of the first coupling member are conical, flaring from the front face towards the rear face of the flange of the first coupling member and such that the outside diameter of the flange of the first coupling member is greater than the outside diameter of the flange of the second coupling member by an amount equal to the average difference $\delta_1$ between the radii of each conical hole in the flange of the first coupling member and of each assembly means.

In an embodiment of the invention, the assembly means comprise spherical-head bolts screwed into the flange of the second coupling member and washers having spherical bearing surfaces installed between the heads of the bolts and the rear face of the flange of the first coupling member.

The radius of the threaded section of each screw is greater than the radius of its smooth section by an amount equal to the height of the thread.

Preferably, a minimum gap of about 2 mm is formed between the facing surfaces of the retaining ring and the second coupling member.

In a particular embodiment, the coupling members are made of a nickel alloy known under the reference EP-99 (Russian grade).

In another embodiment, the coupling members are made of a nickel alloy known as Waspaloy, Nc20K14 state T1130.

In an aspect of the invention, the metal gasket is made of a refractory nickel alloy made by powder metallurgy, suitable for withstanding hydrogen, and having a uniform fine-grain structure with isotropic properties and coated in sealing layers.

Preferably, the metal gasket is coated in three sealing layers, the inner layer of the coating being of nickel, the second layer being of silver, and the outer layer being an antifriction lubricant of inorganic material that is compatible with the fluid used.

In which case, the thickness of the nickel layer lies in the range 30 micrometers (μm) to 70 μm, the thickness of the silver layer lies in the range 15 μm to 30 μm, and the thickness of the lubricating layer lies in the range 1 μm to 5 μm.

In a first particular embodiment, the metal gasket is made of a granular nickel alloy made by powder metallurgy and known under the name EP741NP (Russian grade).

In which case, the EP741NP alloy has a uniform fine grain structure with a mean grain size lying in the range 50 μm to 60 μm.

In another embodiment, the metal gasket is made of a granular nickel alloy made by powder metallurgy and known under the name Astroloy, NK17CDAT state-T1400.

Preferably, the resilient lips of said metal gasket are of thickness that varies along their length, with the thickness increasing towards the structural ring of the gasket.

In which case, the thickness of the resilient lips lies in the range 0.7 mm to 1.2 mm, with a ratio of length over thickness lying in the range 3.5 to 8.

BRIEF DESCRIPTION OF THE DRAWINGS

Other characteristics and advantages of the invention will appear more clearly on reading the following description of particular embodiments given as non-limiting examples and with reference to the accompanying drawings, in which.

DETAILED DESCRIPTION OF EMBODIMENTS OF THE INVENTION

Figure 1:
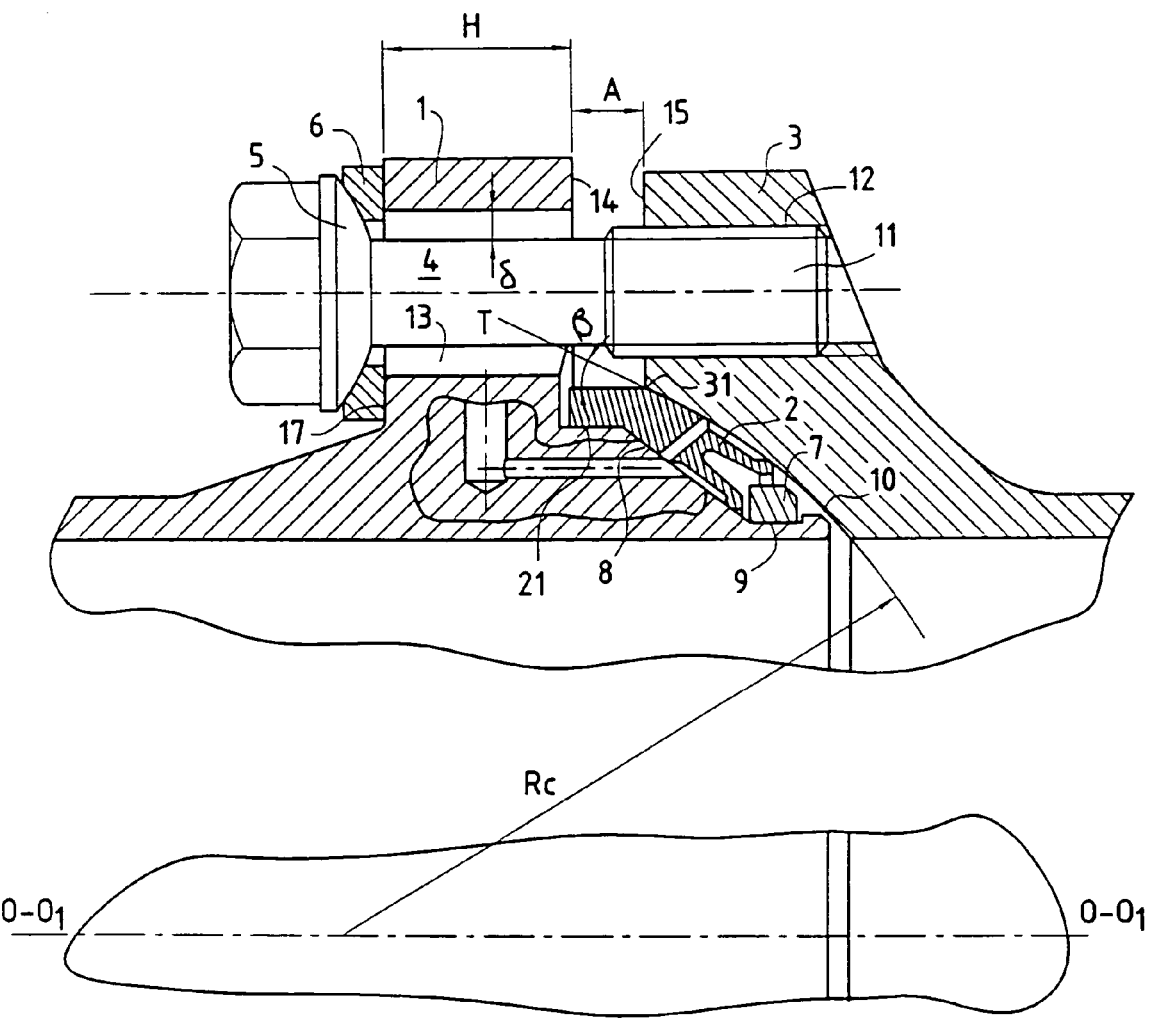
FIG. 1 is a fragmentary section view of an embodiment of the flanged coupling device with a static ball-and-socket joint of the invention, with the coupling members being in alignment.

Reference is now made to the drawings and more precisely to FIG. 1 which shows a flanged coupling device with a static ball-and-socket joint. The device comprises a first coupling member 1, a two-barrier metal gasket 2, a second coupling member 3, bolts 4 with spherical heads 5, washers 6 with spherical bearing surfaces, and a retaining ring 7. The first coupling member 1 has a seat 21 with a cylindrical surface, a sealing surface 8 of conical shape (which in a variant could be of spherical, toroidal, or other shape), and a channel 9 for receiving the retaining ring 7 which is split into a plurality of portions. The second coupling member 3 has a concave sealing surface 10 forming a portion of a sphere with a radius of curvature $R_c$ centered on the flow axis. The radius of curvature $R_c$ of the spherical surface 10 from a center situated on the central axis $O_1$—$O_1$ of the second coupling member 3 is selected in such a manner that the tangent T to the outer spherical surface 10 at the point 31 where the outer diameter is at a maximum forms an angle β relative to the axis $O_1$—$O_1$ of the coupling that lies in the range 27° to 33° (27°≦β≦33°).

A gap A between facing flange faces 14 and 15 of the two coupling members 1 and 3 and radial clearance δ equal to the difference between the radius of a cylindrical hole 13 through the first flange 1 and the radius of the smooth portion of a bolt 4 are provided to accommodate a certain amount of angular offset between the axes of these flowlines.

The reduction in the strength of the first flange 1 due to the diameters of the cylindrical holes 13 being greater than the diameters of the capped holes 12 in the second flange 3 is compensated by increasing the diameter of the first flange 1 by an amount equal to δ, compared with the diameter of the second flange 3.

The threaded sections 11 of the bolts 4 are screwed into suitable holes 12 located in the second flange 3. The radius of the threaded section 11 is greater than the radius of the smooth section of the bolt by a value equal to the height of the thread.

A minimum difference of about 2 mm is provided between the facing surfaces of the retaining ring 7 and the second coupling member 3 so that the metal gasket 2 is protected against high temperature impact of the flow of gas.

The coupling members can be made of the refractory nickel alloy known as EP-99 or of Waspaloy Nc20K14 state T1130.

Figure 2:
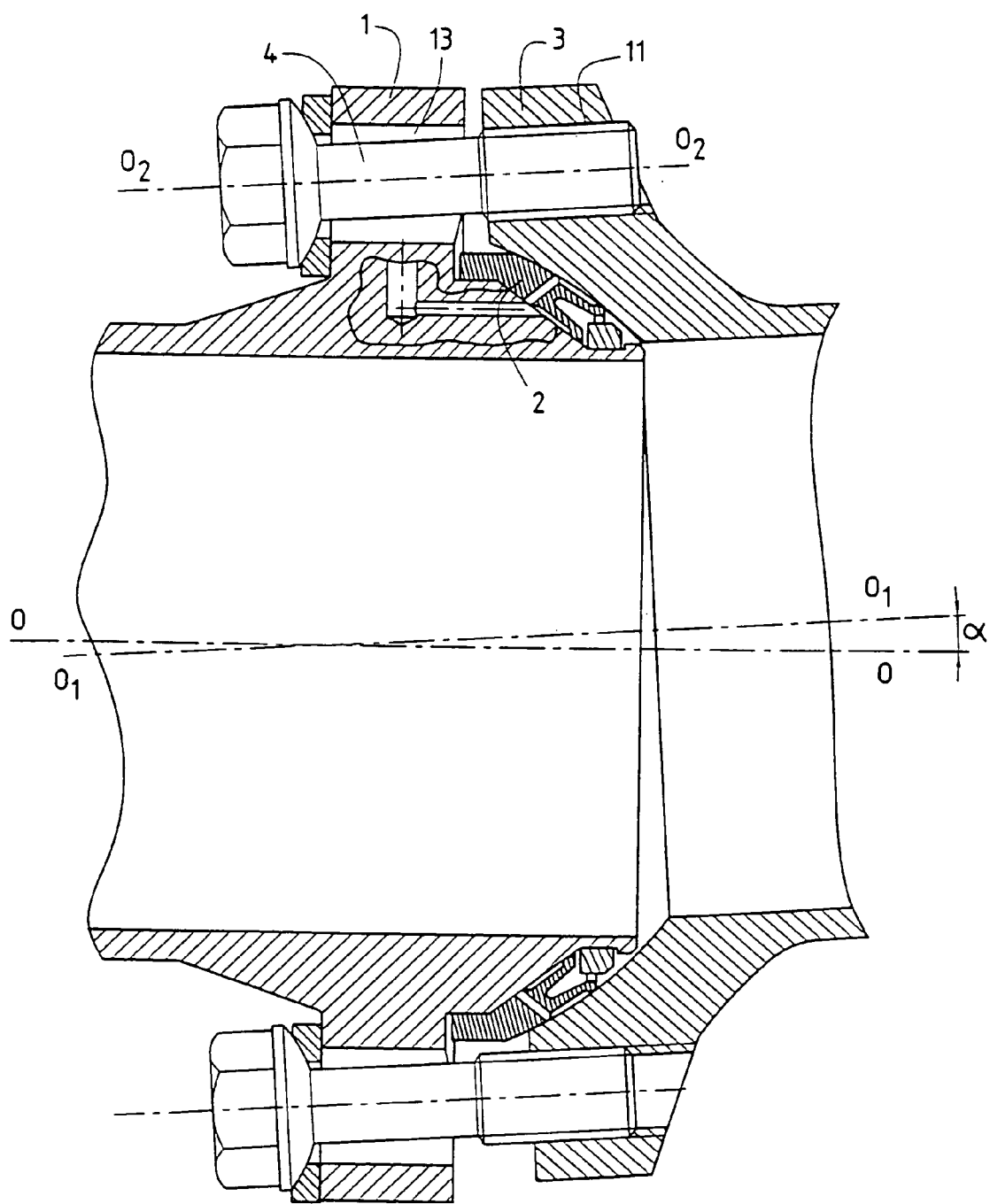
FIG. 2 is a section view of an embodiment of the flanged coupling device with a static ball-and-socket joint of the invention with coupling members on axes O—O and $O_1$—$O_1$ that are at a certain angle α to each other, cylindrical holes being formed for bolts in a first flange.

FIG. 2 shows the flanged coupling device with a static ball-and-socket joint assembled with an angle of deflection α between the axis $O_1$—$O_1$ of the second coupling member 3 and the axis O—O of the first coupling member 1, which angle is also equal to the deflection angle between the axis $O_2$—$O_2$ of each bolt relative to the axis O—O of the first coupling member 1 in the case where the holes 13 are cylindrical.

Figure 3:
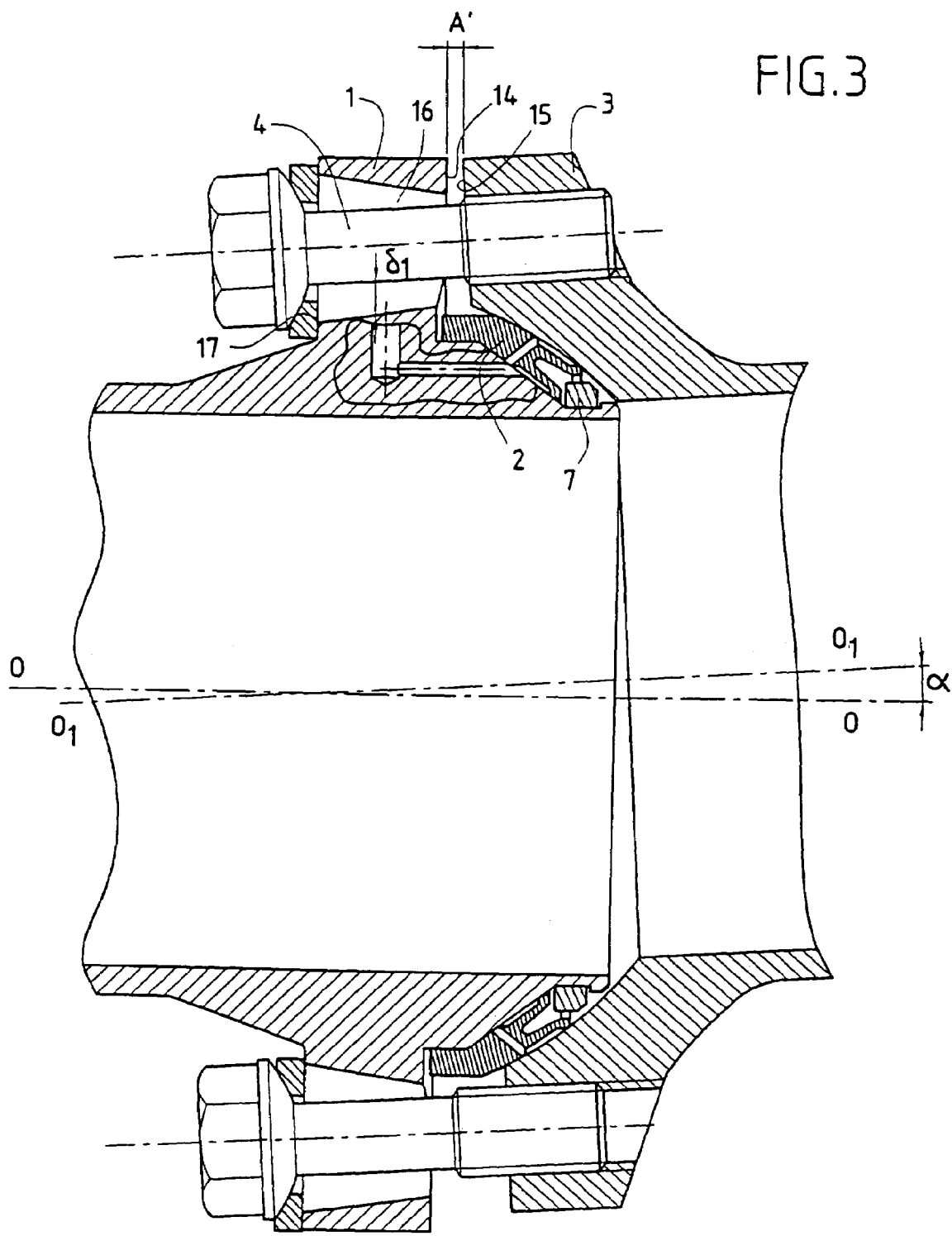
FIG. 3 is a section view through another embodiment of the flanged coupling device with a static ball-and-socket joint of the invention with coupling members whose axes O—O and $O_1$—$O_1$ are at a certain angle α to each other, conical holes being formed for screws in a first flange.

FIG. 3 shows the flanged coupling device with a static ball-and-socket joint assembled with an angle of deflection α between the axis $O_1$—$O_1$ of the second coupling member 3 relative to the axis O—O of the first coupling member 1 which is also equal to the deflection angle between the axis $O_2$—$O_2$ of each bolt relative to the axis O—O of the first coupling member 1 for the case where the holes 16 are conical. The distance A' between the faces 14 and 15 varies relative to the distance A between the same faces when the axes O—O and $O_1$—$O_1$ are in alignment.

The deflection angle α between the axes of the coupling members is given by the following inequality:

$$\tan\alpha \leq \frac{A}{R_i \cdot \cos\beta} \quad (1)$$

where:

A in mm is the axial distance between the face 14 of the first flange 1 and the facing face 15 of the second flange 3 when the coupling members are assembled in alignment (FIG. 1);

$R_c$ in mm is the radius of curvature of the spherical surface 10 common to the second coupling member 3 and the gasket 2; and β is the tilt angle of the tangent T to the spherical surface 10 common to the gasket 2 and the second coupling member 3 at the point 31 where its outside diameter is at a maximum, and satisfies 27°≦β≦33°.

Inequality (1) gives an upper limit on the deflection angle as a function of A, $R_c$, and β. It shows clearly that for 27°≦β≦33°, the upper limit is greater, thereby making it possible on assembly for the angular offset between the axes of the coupling members to be extended.

The radial distance angle δ formed by the clearance between the assembly means 4 and the holes 13 in the first flange satisfy the inequality:

$$\delta \geq (A+H) \cdot \tan\alpha \quad (2)$$

where:

H in mm is the thickness in the axial direction of the flange-forming portion of the first coupling member 1.

Figure 4:
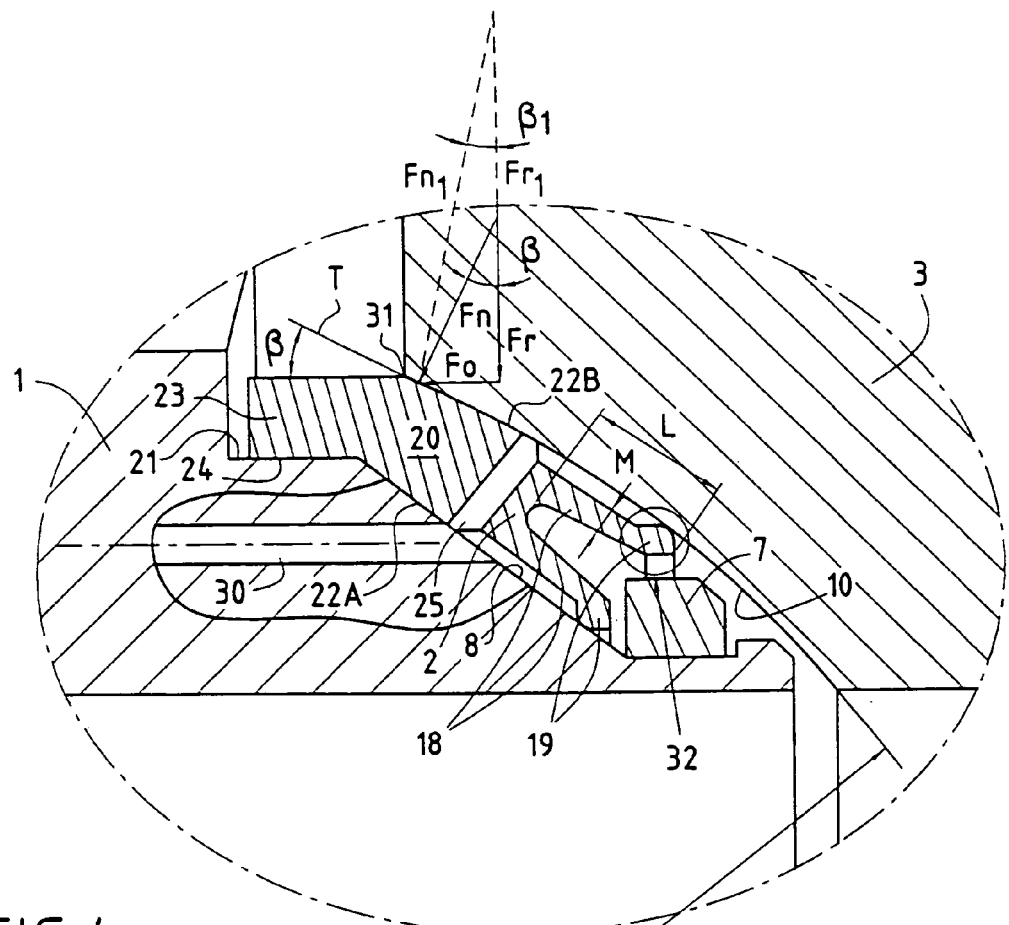
FIG. 4 shows an enlarged portion of FIG. 1 showing in section portions of the coupling device in contact with a gasket.

FIG. 4 is an enlarged portion of FIG. 1 showing the metal gasket 2 between the first and second coupling members 1 and 3. The metal gasket 2 comprises a structural portion 20 which terminates on one side in two fine and resilient lips 18 and on the other side in a cylindrical ring 23 whose axis corresponds to the axis O—O of the first coupling member 1. The structural portion 20 has an outer sealing surface of spherical shape 22B having a radius of curvature $R'_c$ that is less than or equal to the radius of curvature $R_c$ of the spherical surface 10 of the second coupling member 3 ($R'_c \leq R_c$) which is in leakproof contact with the spherical surface 10, and an inner surface 22A which matches the sealing surface 8 of the first coupling member and which can be of conical or other shape. Each of the two fine and resilient lips 18 is terminated by a toroidal swelling or bead 19 in leakproof contact with the sealing surfaces 8 and 10 respectively. Thus, the first sealing barrier is formed by the beads 19 on the lips 18, and the second sealing barrier is formed by the surfaces 22A and 22B of the metal gasket 2.

The cylindrical ring 23 has an inner alignment surface 24 in contact with the cylindrical-surface seat 21 of the first coupling member 1. Monitoring holes 25 co-operating with drainage channels 30 in the first coupling member are provided between the sealing barriers. The monitoring holes 25 are for the purpose of purging leaks through the first sealing barrier and they serve to balance pressure upstream and downstream of the second barrier. Furthermore, the drainage channels 30 are made specifically to monitor leaks downstream from the first barrier and also to test the hydraulic behavior of the second barrier under operating conditions.

FIG. 4 shows that for a certain given clamping force $F_0$, the radial component $F_r$ for an angle β is smaller than the radial component $F_{r1}$ for an angle $β_1$ less than β. Consequently, for 27°≦β≦33°, the radial component of the force acting on the coupled parts is smaller than for 10°≦$β_1$≦20°. Furthermore, the length of the arc of the spherical portion 10 of the second coupling member 3 provides a length that is sufficient for the resilient lips 18, thereby improving their pliability and leakproofing of the gasket and providing adequate length to the structural ring 20 to enable the angle α between the axes of the coupling members to reach 6°. However, if β were to be selected to be greater than 33°, then it would be necessary to increase the diameter of the coupling and the size of the gasket, including the length of the resilient lips, and that would significantly increase the mass of the device.

To provide good operation and sealing at high pressure of up to 450 kilograms per square centimeter ($kg/cm^2$) and high temperature of up to 800° C. in a medium containing hydrogen, the gasket 2 is made of a refractory granular nickel alloy that withstands hydrogen and that has a uniform fine-grained structure with isotropic properties. In addition, the gasket is coated in three sealing layers 26. Advantageously, the material used for the gasket 2 is the granular nickel alloy known under the name EP741NP (Russian grade). The alloy is made using the metallurgical technique of hot isostatic pressing of a metal powder. Because of its uniform fine-grain structure where the average grain size lies in the range 50 μm to 60 μm, and because of the physical and mechanical properties of this alloy, it is possible to have fine resilient lips on the gasket and to improve their pliability. It is then possible to make the resilient lips 18 with fine walls of thickness lying in the range 0.7 mm to 1.2 mm. The thickness M of each resilient lip varies along its length. The thickness M increases towards the structural ring 20 of the gasket 2. The ratio of the length L of the lips over the thickness M of said lips lies in the range 3.5 to 8 (3.5≦L/M≦8). The isotropic properties of the alloy improve the relationship between fatigue and stress and improve the cycling characteristics of the gasket.

To manufacture the gasket 2, other materials can be used, for example the granular nickel alloy known under the name Astroloy, NK17CDAT state T1400 (European grade).

Figure 5:
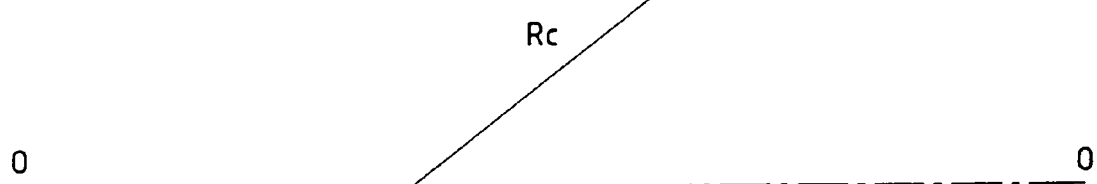
FIG. 5 shows an enlarged portion of a detail of the FIG. 4 gasket, showing three coating layers thereon.
Figure 5:
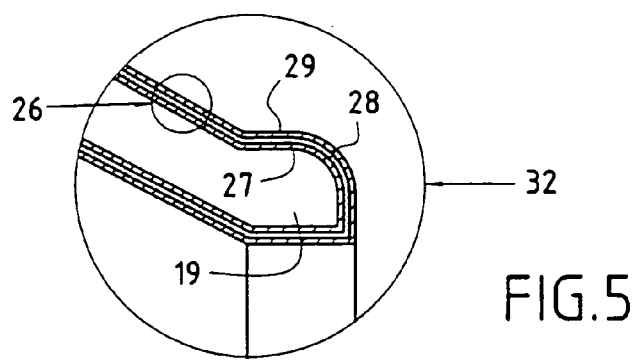

FIG. 5 shows the coating made on the gasket 2 that has three layers. The inner layer 27 of the coating 26 is made of annealed nickel to a thickness lying in the range 30 μm to 70 μm, having microscopic hardness of about 1300 Newtons per millimeter (N/mm). The nickel is applied over the entire surface of the gasket 2 by galvanization. The second layer 28 of the coating 26 is of silver to a thickness lying in the range 15 μm to 30 μm, having microscopic hardness of about 700 N/mm. The silver layer can be applied over the entire surface of the gasket or solely over those surfaces which come into contact with the sealing surfaces and those which come into contact with the fluid. It is essential to ensure that the Ag layer is of good uniformity and to ensure that there are no pores or wells therein so as to ensure that hot gases cannot come directly into contact with the Ni coating. The outer layer 29 of the coating 26 is an antifriction lubricant of an inorganic material compatible with the fluid used. The lubricant is applied over the entire surface of the gasket 2. The thickness of the lubricant lies in the range 1 μm to 5 μm.

Embodiments of how the coupling members can be assembled together with an angle α between their axes are described below with reference to FIGS. 2 and 3. The gasket 2 is installed on the first coupling member 1 and is aligned on the cylindrical-surface seat 21 via the inner surface 24 of the cylindrical ring 23. The gasket 2 is held in place by the retaining ring 7, e.g. made of INCO 625 Nc22DNb state R. The washers 6 with spherical bearing surfaces (e.g. made of Waspaloy NC20K14 state T1130 without any silver coating) are installed between the spherical heads 5 of the bolts 4 (e.g. made of Waspaloy with a silver coating on the threads and the spherical bearing surface) and the rear face of the first coupling flange 1. The bolts 4 are inserted into cylindrical holes 13 (FIG. 2) or conical holes 16 (FIG. 3). In the case of conical holes 16 (FIG. 3), the holes flare from the front face 14 towards the rear face 17.

The bolts 4 of axis $O_2$—$O_2$ are passed through the radial clearance $\delta$ or $\delta_1$ at an angle $\alpha$ relative to the axis O—O of the first coupling member 1 and they are screwed into the second flange 3 so that the axial offset between the face 14 of the first flange 1 and the facing face 15 of the second flange 3 is A. The radial gap $\delta$ or $\delta_1$ and the axial offset A make it possible to accommodate an angle of as much as 6° between the axes of the coupling members.

Immediately prior to assembly, the non-organic lubricant 29 (FIG. 5) is applied to the entire surface area of the gasket 2. During the installation process, the lubricant penetrates into the microscopic irregularities in the sealing surfaces 8 and 10 of the coupling members and prevents the silver layer 28 of the coating 26 on the gasket 2 being damaged and also prevents damage to the sealing surfaces 8 and 10 of the coupling members when contacting portions move relative to one another.

By tightening further, the cylindrically-shaped ring 23 of the gasket 2 is caused to slide along the cylindrical seat 24 of the first coupling member 1, with the structural ring 20 deforming and the thickness of the resilient lips decreasing until complete leakproof contact is established between the sealing surface of the structural ring 20 and the sealing surfaces of the beads 19 on the lips with the sealing surfaces 8 and 10 of the coupling members. The thickness of the layer of silver 28 in the coating 26 decreases because of the contact pressure established by sealing the coupling.

The contact pressure on the sealing surfaces of the beads 19 of the thin-walled lips increases under a self-sealing effect in the presence of a fluid under pressure and at high temperature. The effects of this internal pressure is to press the gasket 2 radially into the gap between the first and second coupling members 1 and 3. This gives rise to the free portion of the gasket converging towards the periphery of the device. Consequently, the contact pressure on the sealing surfaces increases and the silver layer 28 of the coating 26 deforms further, penetrating into the microscopic irregularities in the sealing surfaces.

In addition to its sealing function, the silver layer 28 of the coating 26 protects the base material of the gasket against penetration by hydrogen molecules.

Under the combined effects of high temperature and vibratory loads, the silver layer 28 becomes thinner and thinner and the sealing function is then provided both by the inner layer 27 of annealed nickel and by the silver layer 28 of the coating 26. Thus, even a very thin layer of silver prevents hydrogen molecules from penetrating into the base material of the gasket 2.

The sealing at the first barrier is monitored by the holes 25 and the drain channels 30 when the device is under pressure. Sealing of the second barrier is monitored along the contact surfaces when pressure is supplied both within the device and through the drainage channels 30.

Because the radius of curvature $R_c$ of the peripheral surface 10 of the second coupling member and of the structural ring 20 of the gasket 2 is selected so that the tangent T to the outer spherical surface 10 at the point 31 where the outer diameter is at its maximum makes an angle $\beta$ relative to the coupling axis, such that $27° \leq \beta \leq 33°$, stresses on the portions of the coupling are decreased, thereby enhancing the long term strength of the gasket 2 and ensuring that it has sufficient lifetime for heavy cyclical loading.

The combined effects of the above characteristics make it possible to manufacture a flanged coupling device having a ball-and-socket joint that is more compact, more reliable, and suitable for applications in additional industrial fields.

This device is suitable for being used in gas flowlines having a flow diameter lying in the range 40 mm to 200 mm with the gas being at a high temperature of up to 800° C. and a high pressure of up to 4500 N/cm$^2$, particularly for fluids containing high penetrability hydrogen operating at heavy cyclic loading of as much as 20 cycles having a total duration that can be as long as 12,000 seconds (s) with a maximum period of 900 s per cycle.

The invention claimed is:

1. A flanged coupling device having a static ball-and-socket joint, the device comprising:
    a first coupling member having a cylindrical-surface seat and a sealing surface;
    a second coupling member having a concave sealing surface that is substantially spherical in shape between a minimum diameter and a maximum diameter;
    a two-barrier metal gasket placed between the sealing surfaces of the first and second coupling members, said gasket comprising:
        two fine and resilient lips each of which is terminated by a toroidal bead in leakproof contact with the sealing surfaces;
        an annular end having an inner surface co-operating with the cylindrical-surface seat; and
        a structural ring having an inner surface in leakproof contact with the sealing surface of the first coupling member, and an outer surface of spherical shape in leakproof contact with the concave sealing surface of spherical shape of the second coupling member;
    leak monitoring means;
    assembly means for assembling together the first and second coupling members so as to hold the gasket between their respective sealing surfaces; and
    means allowing a certain amount of angular deflection between the axes of the coupling members;
    wherein the radius of curvature $R_c$ of the spherical surface of the second coupling member is such that the tilt angle $\beta$ relative to the axis of the first coupling member of the tangent T to the spherical surface common to the gasket and the second coupling member at the point where the diameter of the second coupling member is at its maximum, lies in the range 27° to 33°;
    the means allowing a certain amount of angular deflection between the axes of the coupling members are provided first by a gap A between facing front faces of the two coupling members and by radial clearance $\delta$ due to the difference between the diameters of each of the holes in the flange of the first coupling member and each of the assembly means, the angle $\alpha$ between the axes of the coupling members is given by the following relationship:

$$\tan \alpha > A/R_c \cdot \cos \beta$$

where:
- A in mm is the axial gap between the face of the first coupling member and the facing face of the second coupling member when the assembled coupling members are in alignment;
- $R_c$ in mm is the radius of curvature of the spherical surface common to the second coupling member and the gasket;
- β is the tilt angle relative to the axis of the first coupling member of the tangent T to the spherical surface common to the gasket and to the second coupling member at the point where its outside diameter is at a maximum, where β lies in the range 27° to 33°; and
- the length of the radial clearance δ due to the difference in diameter between each hole in the first coupling member and each assembling means satisfies the relationship:

$$\delta \leq (A+H) \cdot \tan \alpha$$

where H in mm is the thickness of the flange of the first coupling member, the two-barrier metal gasket placed between the sealing surfaces of the first and second coupling members is held by a retaining ring and the metal gasket is made of a refractory nickel alloy made by powder metallurgy, suitable for withstanding hydrogen, and having a uniform fine-grain structure with isotropic properties and coated in sealing layers.

2. A flanged coupling device with a static ball-and-socket joint according to claim 1, wherein the sealing surface of the first coupling member is a frustoconical surface.

3. A flanged coupling device with a static ball-and-socket joint according to claim 2, wherein a portion of the inner surface of the metal gasket is conical in shape.

4. A flanged coupling device with a static ball-and-socket joint according to claim 1, wherein the leak monitoring means is provided by monitoring holes through the gasket between its two barriers and co-operating with drainage channels in the first coupling member.

5. A flanged coupling device with a static ball-and-socket joint according to claim 1, wherein the holes for the assembly means in the flange of the first coupling member are cylindrical.

6. A flanged coupling device with a static ball-and-socket joint according to claim 1, wherein the outside diameter of the flange of the first coupling member is greater than the outside diameter of the flange of the second coupling member by an amount which is equal to the difference δ between the radii of each of the holes through the flange of the first coupling member and each of the assembly means.

7. A flanged coupling device with a static ball-and-socket joint according to claim 1, wherein the holes for the assembly means through the flange of the first coupling member are conical, flaring from the front face towards the rear face of the flange of the first coupling member and such that the outside diameter of the flange of the first coupling member is greater than the outside diameter of the flange of the second coupling member by an amount equal to the average difference $\delta_1$ between the radii of each conical hole in the flange of the first coupling member and of each assembly means.

8. A flanged coupling device with a static ball-and-socket joint according to claim 1, wherein the assembly means comprise bolts with spherical heads screwed into the flange of the second coupling member and washers having spherical bearing surfaces installed between the heads of the bolts and the rear face of the flange of the first coupling member.

9. A flanged coupling device with a static ball-and-socket joint according to claim 8, wherein the radius of the threaded section of each screw is greater than the radius of its smooth section by an amount equal to the height of the thread.

10. A flanged coupling device with a static ball-and-socket joint according to claim 1, wherein a minimum gap of about 2 mm is formed between the facing surfaces of the retaining ring and the second coupling member.

11. A flanged coupling device with a static ball-and-socket joint according to claim 1, wherein the coupling members are made of a nickel alloy known under the name EP-99.

12. A flanged coupling device with a static ball-and-socket joint according to claim 1, wherein the coupling members are made of a nickel alloy.

13. A flanged coupling device with a static ball-and-socket joint according to claim 1, wherein said metal gasket is coated in three sealing layers, the inner layer of the coating being of nickel, the second layer being of silver, and the outer layer being an antifriction lubricant of inorganic material that is compatible with the fluid used.

14. A flanged coupling device with a static ball-and-socket joint according to claim 13, wherein the thickness of the nickel layer lies in the range 30 μm to 70 μm, the thickness of the silver layer lies in the range 15 μm to 30 μm, and the thickness of the lubricating layer lies in the range 1 μm to 5 μm.

15. A flanged coupling device with a static ball-and-socket joint according to claim 1, wherein the metal gasket is made of a granular nickel alloy made by powder metallurgy and known under the name EP741NP.

16. A flanged coupling device with a static ball-and-socket joint according to claim 15, wherein the EP741NP alloy has a uniform fine grain structure with a mean grain size lying in the range 50 μm to 60 μm.

17. A flanged coupling device with a static ball-and-socket joint according to claim 1, wherein the metal gasket is made of a granular nickel alloy made by powder metallurgy.

18. A flanged coupling device with a static ball-and-socket joint according to claim 1, wherein the resilient lips of said metal gasket are of thickness that varies along their length, with the thickness increasing towards the structural ring of the gasket.

19. A flanged coupling device with a static ball-and-socket joint according to claim 18, wherein the thickness of the resilient lips lies in the range 0.7 mm to 1.2 mm, with a ratio of length over thickness lying in the range 3.5 to 8.

* * * * *

UNITED STATES PATENT AND TRADEMARK OFFICE
CERTIFICATE OF CORRECTION

PATENT NO.       : 7,118,139 B2                                  Page 1 of 1
APPLICATION NO.  : 10/481200
DATED            : October 10, 2006
INVENTOR(S)      : Boris Ivanovitch Katorgin et al.

It is certified that error appears in the above-identified patent and that said Letters Patent is hereby corrected as shown below:

Title Page, Abstract, line 7, "Teh" should read --The--;

Title Page, Abstract, line 20, "second layers (28)" should read --second layer (28)--;

— Column 3, line 64, " $\tan\alpha \leq \dfrac{A}{R_i \cdot \cos\beta}$ "

should read
-- $\tan\alpha \leq \dfrac{A}{R_{c[l]} \cdot \cos\beta}$ --;

— Column 7, equation (1), " $\tan\alpha \leq \dfrac{A}{R_i \cdot \cos\beta}$ "

should read
-- $\tan\alpha \leq \dfrac{A}{R_{c[l]} \cdot \cos\beta}$ --;

— Column 10, claim 1, line 67, "$\tan\alpha > A/R_c \cdot \cos\beta$" should read
--$\tan\alpha \leq A/R_c \cdot \cos\beta$; and--

— Column 11, claim 1, line 18, "$\delta \leq (A+H) \cdot \tan\alpha$" should read
--$\delta \geq (A+H) \cdot \tan\alpha$--.

Signed and Sealed this

Twenty-seventh Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,118,139 B2  
APPLICATION NO. : 10/481200  
DATED : October 10, 2006  
INVENTOR(S) : Boris Ivanovitch Katorgin et al.

Page 1 of 1

It is certified that error appears in the above-identified patent and that said Letters Patent is hereby corrected as shown below:

Title Page, Abstract, line 7, "Teh" should read --The--;

Title Page, Abstract, line 20, "second layers (28)" should read --second layer (28)--;

— Column 3, line 64, " $\tan\alpha \leq \dfrac{A}{R_i \cdot \cos\beta}$ "

should read

-- $\tan\alpha \leq \dfrac{A}{R_{c[l]} \cdot \cos\beta}$ --;

— Column 7, equation (1), " $\tan\alpha \leq \dfrac{A}{R_i \cdot \cos\beta}$ "

should read

-- $\tan\alpha \leq \dfrac{A}{R_{c[l]} \cdot \cos\beta}$ --;

— Column 10, claim 1, line 67, "tan α > A/R$_c$ · cosβ" should read  
--tan α ≤ A/R$_c$ · cosβ--; and — Column 11, claim 1, line 18, "δ ≤ (A+H) · tan α" should read  
--δ ≥ (A+H) · tanα--.

This certificate supersedes Certificate of Correction issued March 27, 2007.

Signed and Sealed this

Third Day of July, 2007

JON W. DUDAS  
*Director of the United States Patent and Trademark Office*